(12) United States Patent
Bonhote et al.

(10) Patent No.: US 7,770,285 B2
(45) Date of Patent: Aug. 10, 2010

(54) METHOD OF FORMING A MAGNETIC READ/WRITE HEAD

(75) Inventors: Christian R. Bonhote, San Jose, CA (US); Malika D. Carter, San Jose, CA (US); David A. Dudek, San Jose, CA (US); Wen-Chien D. Hsiao, San Jose, CA (US); John W. Lam, San Jose, CA (US); Vladimir Nikitin, Campbell, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 127 days.

(21) Appl. No.: 12/058,584

(22) Filed: Mar. 28, 2008

(65) Prior Publication Data

US 2008/0172862 A1 Jul. 24, 2008

Related U.S. Application Data

(62) Division of application No. 11/095,830, filed on Mar. 30, 2005, now abandoned.

(51) Int. Cl.
*G11B 5/127* (2006.01)
*H04R 31/00* (2006.01)

(52) U.S. Cl. .............. 29/603.16; 29/603.07; 29/603.13; 29/603.14; 29/603.15; 29/603.18; 360/121; 360/122; 360/317; 205/119; 205/122

(58) Field of Classification Search .............. 29/603.08, 29/603.12, 603.15, 603.16, 603.18, 606; 205/119, 122; 360/121, 122, 126, 317
See application file for complete search history.

(56) References Cited

U.S. PATENT DOCUMENTS

| | | | | |
|---|---|---|---|---|
| 5,529,814 A | * | 6/1996 | Tan et al. | 427/547 |
| 6,301,089 B1 | * | 10/2001 | Saito et al. | 360/324.12 |
| 6,661,605 B1 | | 12/2003 | Pust et al. | |
| 6,721,138 B1 | | 4/2004 | Chen et al. | |
| 6,747,841 B1 | | 6/2004 | Olim et al. | |
| 6,751,055 B1 | | 6/2004 | Alfoqaha et al. | |
| 6,754,050 B2 | | 6/2004 | Kong et al. | |
| 6,760,191 B1 | | 7/2004 | Yan et al. | |
| 6,804,879 B2 | | 10/2004 | Hsiao et al. | |
| 6,909,578 B1 | * | 6/2005 | Missell et al. | 360/126 |
| 7,035,046 B1 | * | 4/2006 | Young et al. | 360/126 |
| 2004/0012894 A1 | * | 1/2004 | Pust et al. | 360/319 |
| 2005/0219749 A1 | * | 10/2005 | Aoki et al. | 360/126 |

OTHER PUBLICATIONS

Office Action mailed on Dec. 28, 2007, for U.S. Appl. No. 11/095,830, filed Mar. 30, 2005 by Bonhote et al., 13 pgs.

* cited by examiner

*Primary Examiner*—Paul D Kim

(57) ABSTRACT

A magnetic read/write head is produced with an insert layer between the substrate and the magnetic transducer. The insert layer has a lower coefficient of thermal expansion than the substrate, which reduces the temperature pole tip recession (T-PTR) of the head because the insert layer is an intervening layer between the substrate and magnetic transducer. The insert layer is produced by plating, e.g., an Invar layer over the substrate prior to fabricating the magnetic transducer. The Invar layer is annealed and the structure planarized prior to depositing a non-magnetic gap layer followed by the fabrication of the magnetic transducer.

12 Claims, 4 Drawing Sheets

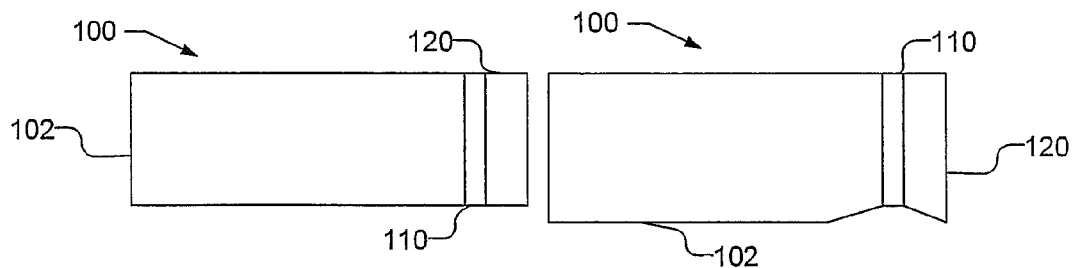
Fig. 2A Fig. 2B
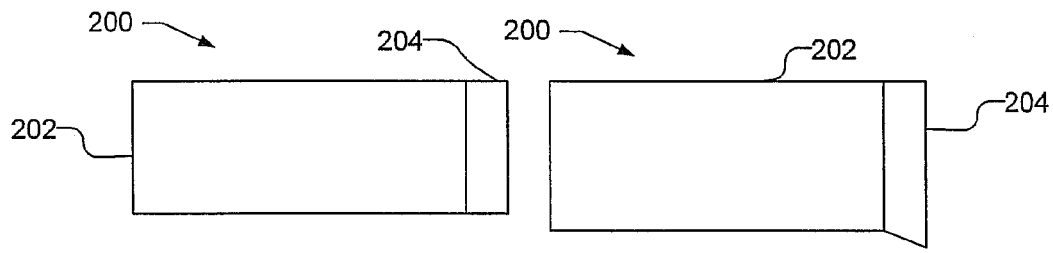
Fig. 3A Fig. 3B
(PRIOR ART) (PRIOR ART)
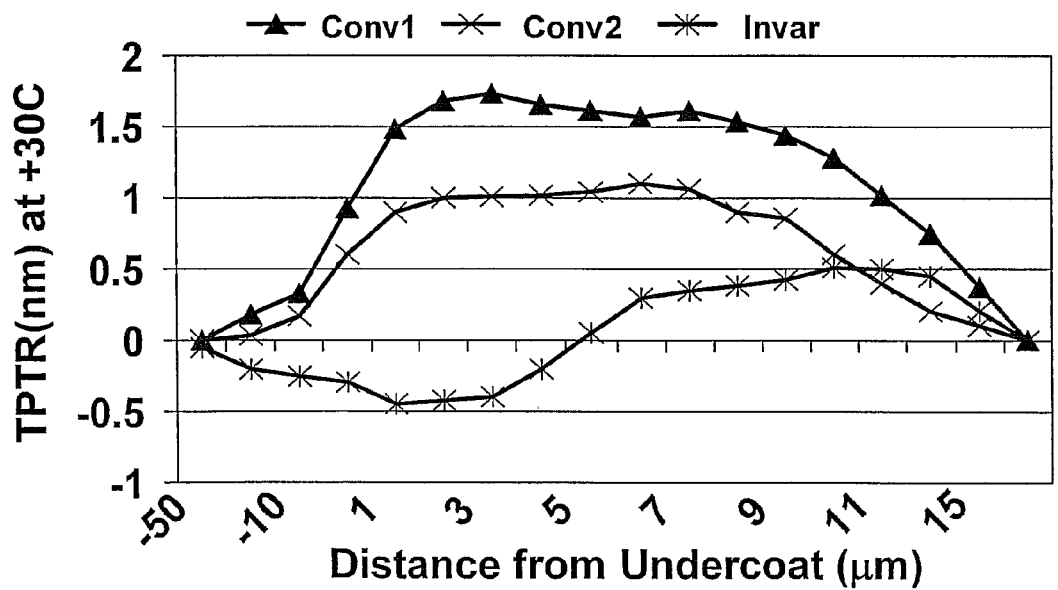
Fig. 4

METHOD OF FORMING A MAGNETIC READ/WRITE HEAD

CROSS REFERENCE TO RELATED APPLICATION

This application is a divisional of U.S. patent application Ser. No. 11/095,830, filed Mar. 30, 2005, now abandoned, entitled "Head Design with Low Coefficient of Thermal Expansion Insert Layer," which is incorporated herein by reference in its entirety.

FIELD OF THE INVENTION

The present invention relates to magnetic read/write heads, and in particular to magnetic read/write heads with reduced thermal pole-tip protrusion.

BACKGROUND

Magnetic read/write heads, such as those used in hard disk drives, include a magnetic transducer with a write element and a read element disposed on a substrate. The write element is an inductive transducer, which includes electrically conductive coil windings that are encircled by a magnetic core. The magnetic core includes a first and second pole tips with a non-magnetic gap disposed between the tips. When electrical current flows through the coil a magnetic field is induced across the non-magnetic gap at the pole tips to write on the magnetic media, i.e., the hard disk, which is near the pole tips.

The read element is typically formed between the write element and the substrate and typically includes first and second shield layers with a magnetoresistive (MR) sensor formed therebetween. Magnetic flux from the surface of the magnetic media causes the rotation of a magnetization vector in the MR sensor, which causes a change in resistivity. Thus, the presence of magnetic flux at the surface of the magnetic media may be detected by measuring the change in resistivity of the MR sensor.

The read/write elements are located at the trailing end of the substrate along the air bearing surface. In operation, the head flies above the spinning magnetic disk so that the read/write elements are positioned in close proximity to the magnetic recording media. Ideally, the read/write elements are close enough to the magnetic media to produce a large data density, however, the distance should be great enough that contact between the read/write elements and the magnetic media does not occur.

Because the read/write elements are fabricated from materials different from that of the substrate, the read/write elements and the substrate typically have differing coefficients of thermal expansion (CTE). Generally, the read/write elements include metallic layers causing the read/write elements to have a greater CTE than the substrate. During operation, as the read/write head flies above the spinning magnetic media, the read/write head is subjected to increased temperatures. The increased temperatures and the greater CTE of the read/write elements causes the read/write elements to protrude closer to the magnetic media than the substrate, which is known as thermal pole tip protrusion (T-PTR). Thus, T-PTR requires an increase in the fly height of the read/write head in order to avoid contact between the read/write elements and the magnetic media during high operating temperatures.

Accordingly, it is desirable to reduce the amount of T-PTR in a read/write head so as to reduce variation in the distance between the read/write elements and the magnetic media during operation, which permits a decrease in the required fly height of the head.

SUMMARY

A magnetic read/write head, in accordance with an embodiment of the present invention, is produced with an insert layer that has a lower CTE than the substrate and that is positioned between the substrate and the magnetic transducer. With the magnetic transducer deposited over the low CTE insert layer, the expansion of the magnetic transducer is restricted during operation thereby decreasing the T-PTR of the head. The insert layer is produced by plating and annealing, e.g., an Invar NiFe layer over the substrate prior to fabricating the magnetic transducer.

In one aspect of the present invention, a magnetic read/write head includes a substrate and a magnetic transducer that is coupled to the substrate. The magnetic transducer has a coefficient of thermal expansion that is greater than the coefficient of thermal expansion of the substrate. The head also includes a conductive layer that is coupled between the substrate and the magnetic transducer. The conductive layer has a coefficient of thermal expansion that is less than the coefficient of thermal expansion of the substrate. In addition, the head includes a non-magnetic layer that is coupled between the conductive layer and the magnetic transducer.

In another aspect of the present invention, a method of forming a magnetic read/write head includes providing a substrate and plating a NiFe layer over the substrate. The NiFe layer is annealed and a non-magnetic layer is deposited over the NiFe layer. A magnetic transducer is then formed over the non-magnetic layer.

In yet another aspect of the present invention, a method of forming a magnetic read/write head includes providing a substrate, plating a conductive layer over the substrate, and annealing the conductive layer, wherein the annealed conductive layer has a coefficient of thermal expansion that is less than the coefficient of thermal expansion of the substrate. The method further includes depositing a non-magnetic layer over the conductive layer and fabricating a magnetic transducer over the non-magnetic layer, wherein the magnetic transducer has a coefficient of thermal expansion that is greater than the coefficient of thermal expansion of the substrate.

BRIEF DESCRIPTION OF THE DRAWINGS

FIGS. 2A and 2B illustrate the effect of T-PTR on a magnet head, in accordance with an embodiment of the present invention, where FIG. 2A illustrates the head prior to heating and FIG. 2B illustrates the head after heating.

FIGS. 3A and 3B illustrate the effect of T-PTR on a conventional head, where FIG. 3A illustrates the head prior to heating and FIG. 3B illustrates the head after heating.

FIG. 4 illustrates a graph modeling the T-PTR for two conventional heads and a head, in accordance with an embodiment of the present invention.

DETAILED DESCRIPTION

Figure 1:
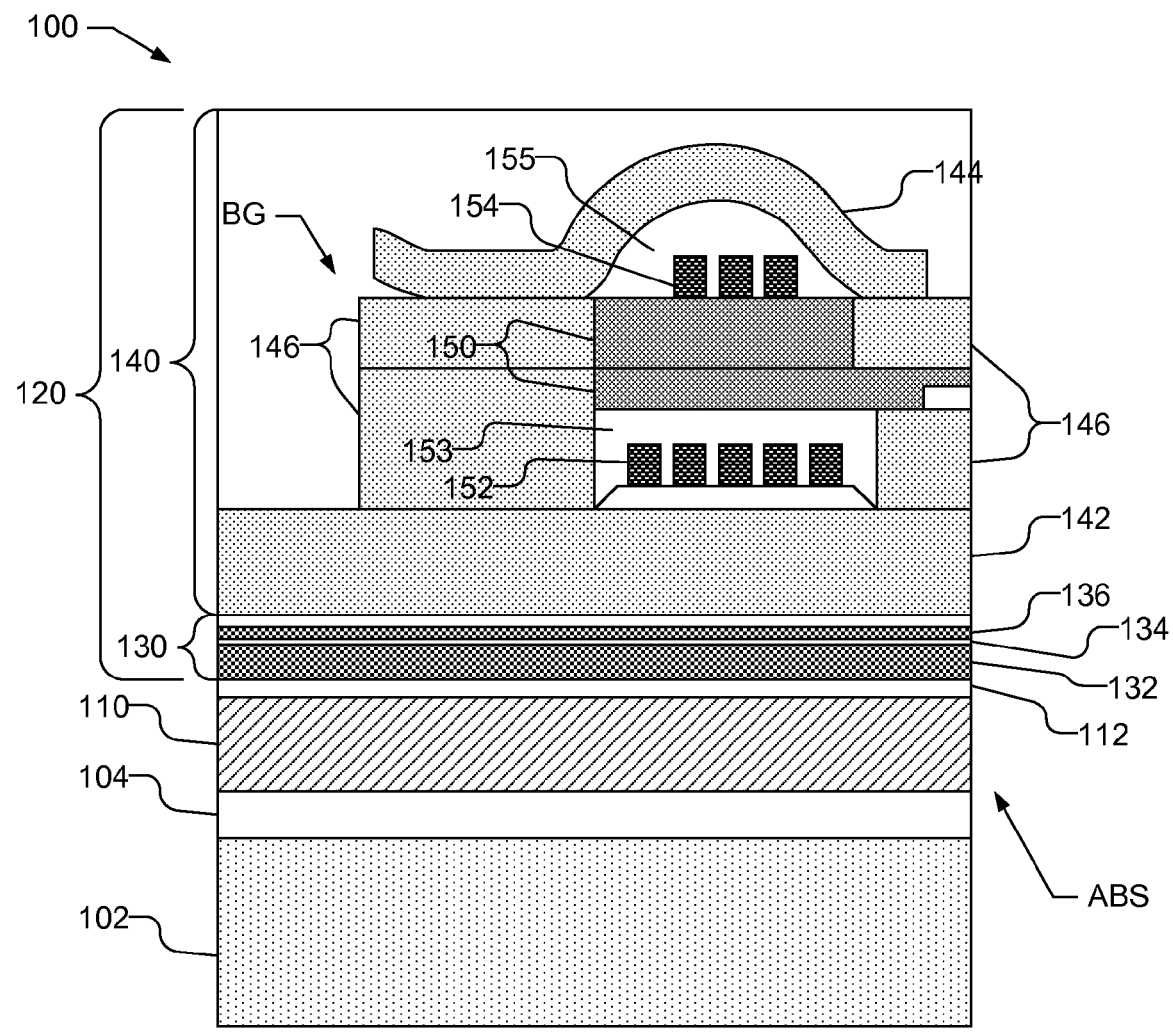
FIG. 1 is a cross-sectional view, perpendicular to the air bearing surface, of a portion of a magnetic read/write head, in accordance with an embodiment of the present invention.

FIG. 1 is a cross-sectional view, perpendicular to the air bearing surface (ABS), of a portion of a magnetic read/write head 100 in accordance with an embodiment of the present invention. The magnetic head 100 includes an insert layer 110 that has a lower coefficient of thermal expansion (CTE) than that of the substrate, which advantageously reduces temperature induced pole tip recession during operation of the head.

As illustrated in FIG. 1, the head 100 includes a slider substrate 102, which is manufactured from materials, such as AlTiC, TiC, Si, SiC $Al_2O_3$ or other similar materials or composites formed from combinations of these materials. An undercoat layer 104, e.g., of alumina, is deposited over the substrate 102. Over the undercoat layer 104 is deposited the insert layer 110. The insert layer 110 is an alloy of nickel (Ni) and iron (Fe), which is sometimes referred to Invar, which advantageously has a low CTE. A non-magnetic spacer 112 is deposited over the insert layer 110. The non-magnetic spacer 112 is used to break the magnetic coupling of the insert layer 110 from the magnetic transducer 120.

A magnetic transducer 120 is fabricated over the non-magnetic spacer 112 in any desired fashion. Magnetic transducers and their fabrication are well known, and accordingly, magnetic transducer 120 is shown merely for illustrative purposes. The present invention is not limited to any particular type of magnetic transducer. Thus, any desired magnetic transducer may be fabricated over the non-magnetic spacer layer 112.

As illustrated in FIG. 1, the magnetic transducer 120 may include, e.g., a read portion 130 with a first shield layer 132, an insulator layer 134 in which is disposed a sensor element (not shown) and a second shield layer 136.

The write portion 140 of the magnetic transducer 120 may include a first pole piece 142 and a second pole piece 144 that are separated at the ABS by a write gap layer 150 and a third pole piece 146. The third pole piece 146 connects the first pole piece 142 and the second pole piece 144 at the back gap (BG). The third pole piece 146 is formed on either side at the write gap layer 150 at the ABS. The write portion 140 also includes two coil layers 152 and 154, which surround the write gap layer 150 and which are covered with resist 153 and 155. It should be understood that the write coil may be in a single layer if desired.

The magnetic read/write head 100 has a reduced amount of T-PTR, relative to conventional heads, because the insert layer 110 has a lower CTE than the substrate 102 and the insert layer 110 is disposed between the substrate 102 and the magnetic transducer 120. During operation, the insert layer 110 will expand less than the substrate 102. Because the magnetic transducer 120 is formed on the insert layer 110, as opposed to the substrate 102, the insert layer 110 will restrict the expansion of the magnetic transducer 120.

FIGS. 2A and 2B illustrate the effect of T-PTR on a magnet head 100, where an insert layer 110 is disposed between the substrate 102 and the magnetic transducer 120.

FIG. 2A illustrates the head 100 prior to heating and FIG. 2B illustrates the head 100 after heating, with the expansion of the substrate 102 and the magnetic transducer 120 greatly exaggerated. As can be seen in FIG. 2B, the insert layer 110, which expands less than the substrate 102, resists the expansion of the magnetic transducer 120. The insert layer 110 limits the expansion of the magnetic transducer 120 to an amount that is closer to the expansion of the substrate 102. Accordingly, the magnetic transducer 120 has little protrusion, illustrated as $T-PTR_{100}$, beyond the substrate 102, resulting in a reduced amount of T-PTR relative to conventional heads.

FIGS. 3A and 3B illustrate the effect of T-PTR on a conventional head 200, where a magnetic transducer 204 is coupled to the substrate 202 without an intervening Invar insert layer. FIG. 3A illustrates the head 200 prior to heating and FIG. 3B illustrates the head 200 after heating with the expansion of the substrate 202 and the magnetic transducer 204 greatly exaggerated. As can be seen in FIG. 3B, in the conventional head 200, the magnetic transducer 204 expands more than the substrate 202 when heated, but the expansion of the magnetic transducer 204 is limited by the substrate 202. Accordingly, the magnetic transducer 204 protrudes closer to the underlying magnetic media (not shown) than the substrate 202, resulting in a large amount of T-PTR.

FIG. 4 illustrates a graph illustrating the modeling results of the T-PTR (in nm at 30° C.) as a function of distance from the undercoat, i.e., layer 104 in FIG. 1, for two conventional heads and a head with an Invar insert, in accordance with the present invention. As can be seen, the head with the Invar insert has a substantial reduction in the T-PTR compared to conventional heads. In fact, the maximum T-PTR for a head in accordance with the present invention is 0.55 nm compared to 1.1 nm for the head labeled Conv2.

Figure 5:
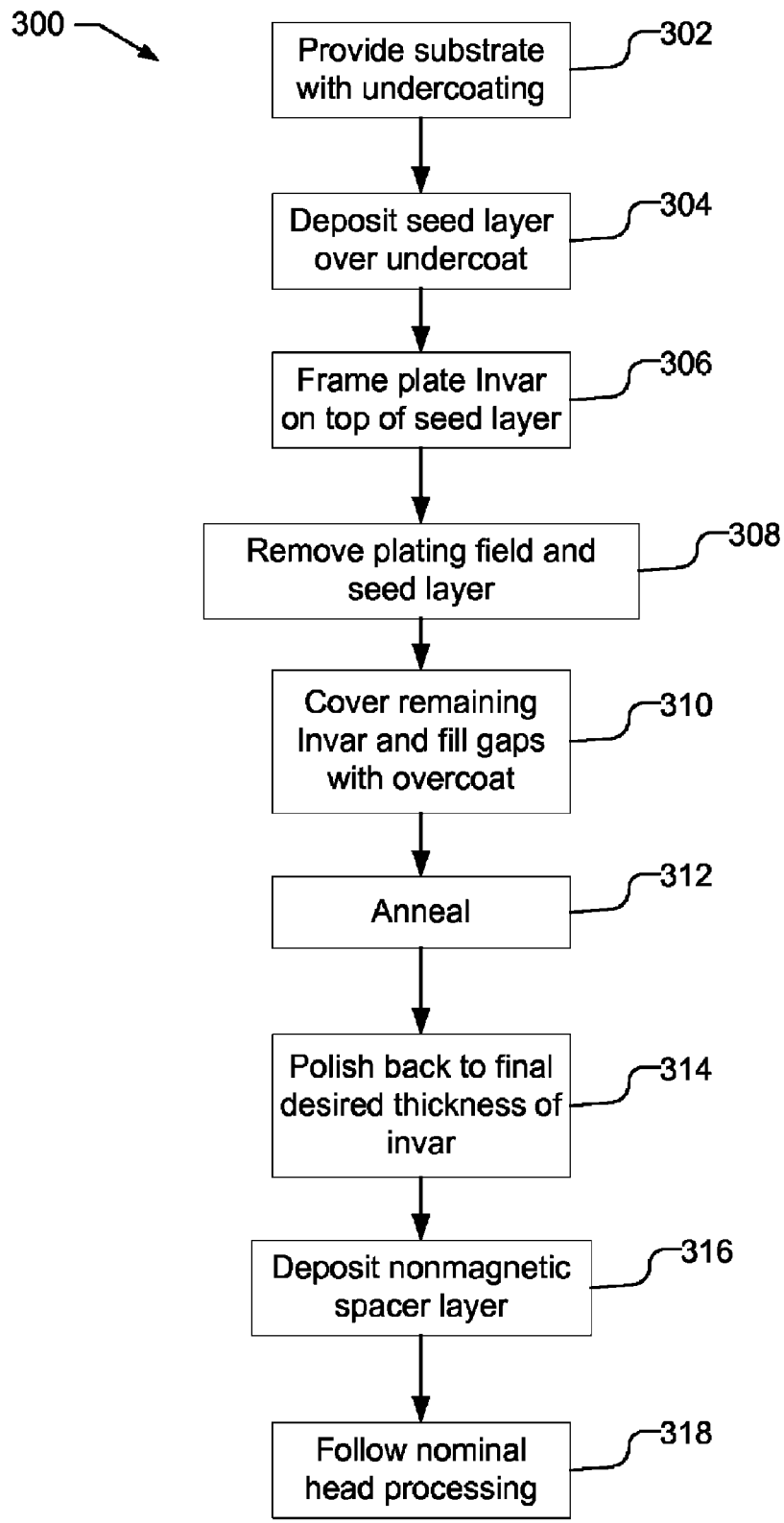
FIG. 5 is a flow chart of the process of fabricating a magnetic read/write head in accordance with an embodiment of the present invention.

FIG. 5 is a flow chart of the process of fabricating a magnetic read/write head in accordance with an embodiment of the present invention. FIGS. 6A-6E schematically illustrates the fabrication process. It should be understood that FIG. 5 and FIGS. 6A-6E, describe the fabrication of a single head for the sake of simplicity and that the fabrication is performed at the wafer level, where multiple heads are fabricated simultaneously and then separated.

As described in FIG. 5, first a substrate with an undercoating is provided (block 302). The substrate may be, e.g., a manufactured from AlTiC, TiC, Si, SiC $Al_2O_3$ or other similar materials or composites formed from combinations of these materials. By way of example, a AlTiC substrate with a CTE of approximately $6 \times 10^{-6}$/° C. may be used. The undercoating may be, e.g., 0.7 μm to 1.0 μm of alumina. A seed layer is then deposited over the undercoating (block 304). The seed layer may be, e.g., 32/68 or 45/55 of nickel and iron, and may be, e.g., sputter deposited to a thickness of, e.g., 300-2000 Å. Other seed layers, including non-magnetic but conductive seed layers, may be used if desired, such as V or NiCr.

Figure 6A:
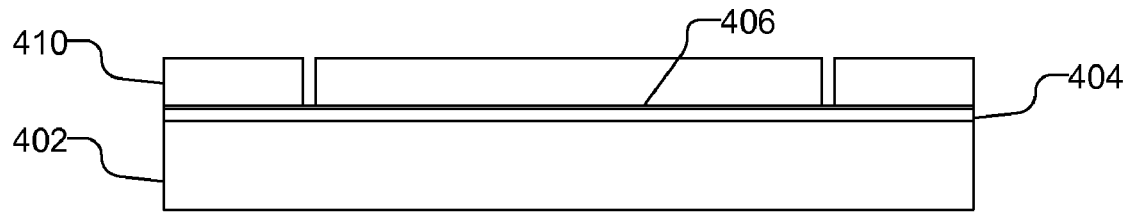
FIGS. 6A-6E schematically illustrates the fabrication process for a magnetic read/write head in accordance with an embodiment of the present invention.

The Invar insert layer is then frame plated over the seed layer (block 306). The Invar insert layer is produced with 34 to 38 percent Ni and 62 to 66 percent Fe to a thickness of between approximately 1.0 μm to 5.0 μm. In one embodiment, Invar insert layer is $Ni_{36}Fe_{64}$ and is approximately 4.0 μm. In another embodiment, the insert may be produced with plated CoNiFe, where Co is 0.1 to 5.0 percent, Ni is 35 to 36 percent, and Fe is 62 to 64 percent. FIG. 6A shows an illustrative cross section of the frame plated Invar insert layer 410 deposited over the seed layer 406, undercoating 404 and the substrate 402. The plating mask for the Invar insert layer may have approximately the same size and/or shape, or larger, as the first shield in the magnetic transducer. If desired, alignment marks may be produced with the frame plating at this step to be used in later fabrication of the magnetic transducer.

Figure 6B:
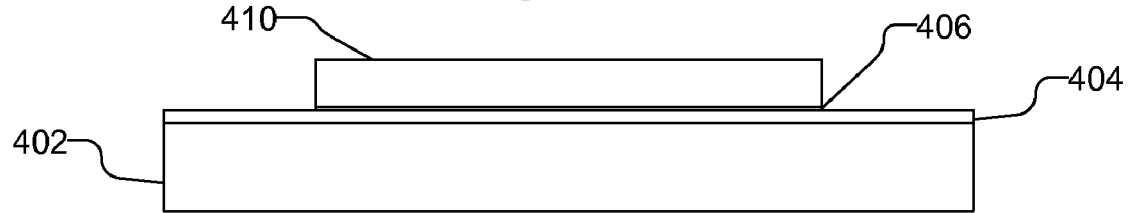
Figure 6C:
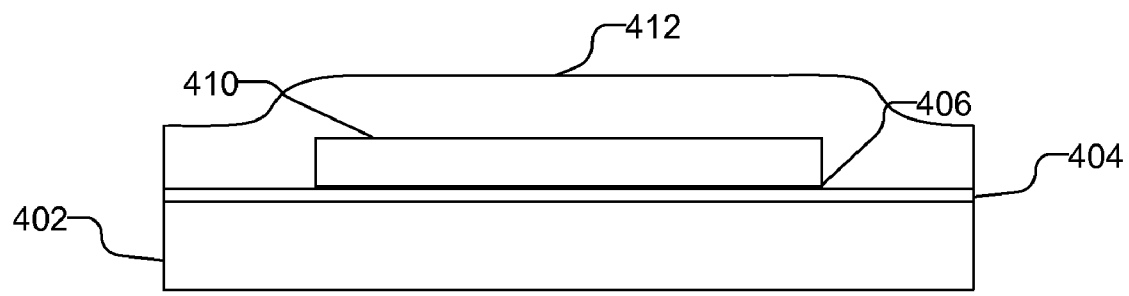

The plating field and the seed layer underlying the plating field are then removed by, e.g., wet etching, (block 308), resulting in the structure shown in FIG. 6B. After the plating field and seed layer removal, the Invar insert layer and gaps are covered with an overcoat layer (block 310). The overcoat layer may be the same material as used for the undercoating, i.e. alumina. FIG. 6C illustrates the resulting structure with the overcoat layer 412 deposited over the Invar insert layer 410. The overcoat layer 412 should be deposited to a thickness that is greater than the Invar insert layer 410, e.g., 4.0 μm to 5.0 μm, so that the structure may be planarized later.

With the Invar insert layer 410 covered with the overcoat layer 412, the structure is annealed at a temperature greater than 450° C., e.g., between approximately 450° C. and 800° C., e.g., at 490° C., for between approximately 1 and 10 hours, e.g., for 2 hours, with a slow temperature ramp (block 312). The annealing of the Invar insert layer 410 advantageously produces a phase transition in the material that reduces the CTE to, e.g., $4.5 \times 10^{-6}$/° C.

Figure 6D:
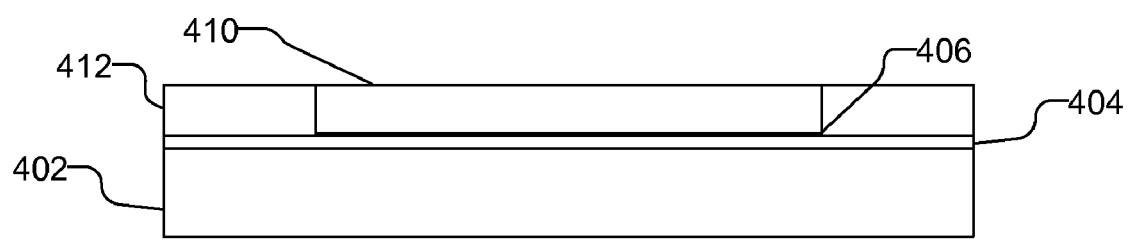

The structure is then planarized, e.g., by chemical mechanical polishing, to the desired final thickness of the Invar insert layer, e.g., 4 μm (block 314). FIG. 6D illustrates the structure after planarizing.

Figure 6E:
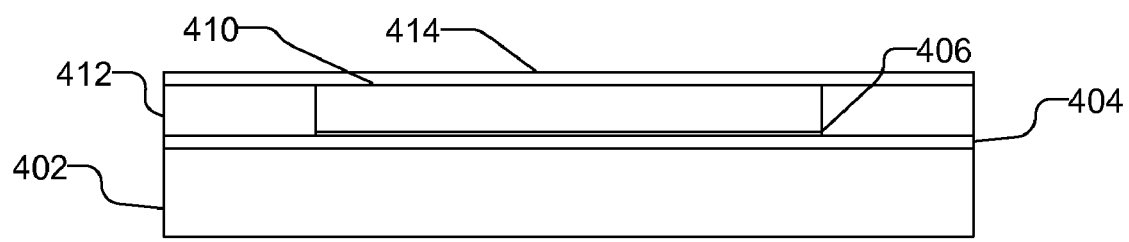

A non-magnetic spacer layer is deposited over the Invar insert layer (block 316). The non-magnetic spacer layer may be, e.g., a layer of Ta, that is sputter deposited to a thickness of approximately 0.1 μm to 1.0 μm, e.g., 0.25 μm. If desired, other non-magnetic low expansion materials, such as $AlO_2$, may be used, however, the use of Ta is desirable as it provides good heat dissipation. FIG. 6E illustrates the structure with the non-magnetic spacer layer 414 over the Invar insert layer 410 and the remaining overcoating layer 412. The deposition of the non-magnetic spacer layer may be followed with any desired conventional magnetic transducer fabrication process (block 318).

Although the present invention is illustrated in connection with specific embodiments for instructional purposes, the present invention is not limited thereto. Various adaptations and modifications may be made without departing from the scope of the invention. For example, additional layers, such as adhesion layers, may be used with the present invention. Moreover, the present invention is not limited to any particular magnetic transducer. Therefore, the spirit and scope of the appended claims should not be limited to the foregoing description.

What is claimed is:

1. A method of forming a magnetic read/write head, the method comprising:
    providing a substrate;
    plating a NiFe layer over the substrate;
    annealing the NiFe layer;
    depositing a non-magnetic layer over the NiFe layer; and
    producing a magnetic transducer over the non-magnetic layer;
    depositing an undercoating layer over the substrate prior to plating the NiFe layer;
    removing a plating field of the NiFe layer;
    depositing a covering layer over the remaining NiFe layer and over the underlying undercoating layer prior to annealing the NiFe layer; and
    polishing the covering layer to expose the underlying NiFe layer.

2. The method of claim 1, wherein the remaining NiFe layer has the approximate dimensions of a bottom shield of the magnetic transducer.

3. The method of claim 1, wherein the covering laying and the undercoating layer comprise alumina.

4. The method of claim 1, wherein the NiFe layer is annealed above approximately 450 degrees C.

5. The method of claim 4, wherein the NiFe layer is annealed at approximately 490 degrees C. for approximately 2 hours.

6. The method of claim 1, wherein the NiFe layer is plated at a ratio of approximately 34 to 38 percent Ni and 62 to 66 percent Fe.

7. The method of claim 1, wherein the NiFe layer further includes Co and is plated at a ratio of approximately 0.1 to 5.0 percent of Co, 35 to 36 percent of Ni, and 62 to 64 percent of Fe.

8. The method of claim 1, wherein the NiFe layer is plated to a thickness of approximately 1.0 μm to 5.0 μm.

9. The method of claim 1, wherein the non-magnetic layer comprises at least one of tantalum and $SiO_2$.

10. The method of claim 9, wherein the non-magnetic layer is deposited to a thickness of approximately 0.1 μm to 1.0 μm.

11. The method of claim 1, wherein the annealed NiFe layer has a coefficient of thermal expansion that is less than the coefficient of thermal expansion of the substrate.

12. A method of forming a magnetic read/write head, the method comprising:
    providing a substrate with a first coefficient of thermal expansion;
    plating a conductive layer over the substrate;
    depositing an undercoating layer over the substrate prior to plating the conductive layer;
    removing a plating field of the conductive layer;
    depositing a covering layer over the remaining conductive layer and over the underlying undercoating layer;
    polishing the covering layer to expose the underlying conductive layer;
    annealing the conductive layer, wherein the annealed conductive layer has a second coefficient of thermal expansion that is less than the first coefficient of thermal expansion;
    depositing a non-magnetic layer over the conductive layer; and
    fabricating a magnetic transducer over the non-magnetic layer, wherein the magnetic transducer has a third coefficient of thermal expansion that is greater than the first coefficient of thermal expansion.

* * * * *